(12) United States Patent
Leung et al.

(10) Patent No.: US 7,036,143 B1
(45) Date of Patent: Apr. 25, 2006

(54) METHODS AND APPARATUS FOR VIRTUAL PRIVATE NETWORK BASED MOBILITY

(75) Inventors: Keng Leung, Mountain View, CA (US); Alpesh S. Patel, Santa Clara, CA (US)

(73) Assignee: Cisco Technology, Inc., San Jose, CA (US)

( * ) Notice: Subject to any disclaimer, the term of this patent is extended or adjusted under 35 U.S.C. 154(b) by 948 days.

(21) Appl. No.: 09/957,519

(22) Filed: Sep. 19, 2001

(51) Int. Cl.
  *H04L 9/00* (2006.01)
  *G06F 15/16* (2006.01)

(52) U.S. Cl. .................. 726/15; 713/168; 709/227; 726/5

(58) Field of Classification Search ............. 713/150, 713/151, 168–170, 200–202; 709/227, 228, 709/230, 245
See application file for complete search history.

(56) References Cited

U.S. PATENT DOCUMENTS

| | | | |
|---|---|---|---|
| 4,692,918 A | 9/1987 | Elliott et al. ................ 370/85 |
| 5,016,244 A | 5/1991 | Massey et al. .............. 370/16 |
| 5,018,133 A | 5/1991 | Tsukakoshi et al. ... 340/825.05 |
| 5,218,600 A | 6/1993 | Schenkyr et al. ........... 370/16 |
| 5,371,852 A | 12/1994 | Attanasio et al. .......... 395/200 |
| 5,473,599 A | 12/1995 | Li et al. .................... 370/16 |
| 5,978,672 A | 11/1999 | Hartmaier et al. ......... 455/413 |
| 6,016,428 A | 1/2000 | Diachina et al. ........ 455/435.1 |
| 6,055,236 A | 4/2000 | Nessette et al. ............ 370/389 |
| 6,075,783 A | 6/2000 | Voit .......................... 370/352 |
| 6,079,020 A * | 6/2000 | Liu ............................ 713/201 |
| 6,081,507 A | 6/2000 | Chao et al. ................ 370/235 |
| 6,122,268 A | 9/2000 | Okanoue et al. ........... 370/338 |
| 6,131,095 A | 10/2000 | Low et al. ................... 707/10 |
| 6,137,791 A | 10/2000 | Frid et al. .................. 370/352 |
| 6,144,671 A | 11/2000 | Perinpanathan et al. .... 370/409 |
| 6,154,839 A * | 11/2000 | Arrow et al. ............... 713/154 |
| 6,173,399 B1 * | 1/2001 | Gilbrech .................... 713/153 |
| 6,175,917 B1 * | 1/2001 | Arrow et al. ................. 713/1 |
| 6,226,748 B1 * | 5/2001 | Bots et al. .................. 713/201 |
| 6,226,751 B1 * | 5/2001 | Arrow et al. ............... 713/201 |
| 6,339,830 B1 | 1/2002 | See et al. ................... 713/202 |
| 6,445,922 B1 | 9/2002 | Hiller et al. |
| 6,522,880 B1 | 2/2003 | Verma et al. |
| 6,683,871 B1 | 1/2004 | Lee et al. |
| 6,701,437 B1 * | 3/2004 | Hoke et al. ................ 713/201 |

OTHER PUBLICATIONS

S. Deering, Network Working Group Request For Comments 1256, "*ICMP Router Discovery Message*", Xerox PARC, Sep. 1991, pp. 1-19.

(Continued)

*Primary Examiner*—Christopher Revak
(74) *Attorney, Agent, or Firm*—Beyer Weaver & Thomas, LLP

(57) ABSTRACT

Methods and apparatus for enabling VPN based mobility are provided. A VPN client having a client subnetwork address corresponding to a particular subnetwork can create a VPN tunnel using an enterprise address from a VPN server. Using the VPN tunnel, the VPN client can establish sessions with a variety of destination nodes including destination nodes on a private or enterprise network associated with the VPN server. When the client moves, the VPN client can acquire a new address that may correspond to a new subnetwork, but the VPN server provides the VPN client with the same enterprise address. Accordingly, the VPN client can maintain existing sessions with destination nodes using the same enterprise address.

63 Claims, 10 Drawing Sheets

OTHER PUBLICATIONS

Gleeson et al., Network Working Group Request For Comments 2764, "*A Framework For IP Based Virtual Private Networks*", Lucent Technologies, Feb. 2000, Copyright © The Internet Society (2000). All rights reserved, pp. 1-62.

Tsirtsis et al., Network Working Group Request For Comments 2766, "*Network Address Translation—Protocol Translation (NAT-PT)*", Campio Communications, Feb. 2000, Copyright (C) The Internet Society (2000). All Rights Reserved, pp. 1-21.

E. Rosen et al., Network Working Group Request for Comments 2547, "*BGP/MPLS VPNs*", Cisco Systems, Inc., Mar. 1999, Copyright (C) The Internet Society (1999). All Rights Reserved., pp. 1-25.

Levkowetz, H. et al., "*Mobile IP NAT/NAPT Traversal using UDP Tunneling*", Internet Draft, Nov. 2001, 23 pages.

Khalil, Mohamed M. et al., "*Generalized NAI (GNAI) Extension for Mobile IPv4*", Internet Draft, Oct. 2001, 6 pages.

Adrangi, Farid and Prakash, Iyer, "*Mobile IPv4 Traversal Across Firewalls*", Internet Draft, Nov. 13, 2001, 30 pages.

S. Kent and R. Atkinson, "Security Architecture for the Internet Protocol", RFC 2401, Nov. 1998, 50 pgs.

Steven Brown, "Implementing Virtual Private Networks".

Release notes for 3Com Corporation, "*Conducting a Redundant Route for Network Resiliency*," Mar. 1994, *NET Builder Family Bridge/Router* pp. 26-29.

Uyless Black, "*TCP/IP and Related Protocols*," 1992, *McGraw-Hill, Inc.*, pp. 226-249.

T. Li, et al., RFC 2281 "*Cisco Hot Standby Router Protocol (HSRP)*," Mar. 1998.

Chambless, et al., "*Home Agent Redundancy Protocol (HARP)*," Oct. 27, 1997.

C. Perkins, "*IP Mobility Support*," RFC 2002, IBM Corporation, Oct. 1996.

"*Mobil IP*," Release 12.0(1)T, pp. 1-55.

Montenegro, G., "*Reverse Tunneling for Mobile IP*," RFC 2344, Sun Microsystems, Inc., May 1998.

D. Harkins and D. Carrel, "*The Internet Key Exchange (IKE)*," Cisco Systems, Jun. 1998.

D. Cong and M. Hamlen, and C. Perkins, "*The Definitions of Managed Objects for IP Mobility Support using SMIv2*," RFC 2006, Motorola and IBM, Oct. 1996.

Aboba and Beadles, "*The Network Access Identifier*" RFC 2486, Jan. 1999.

Calhoun and Perkins, "*Mobile IP Network Access Identifier Extension, for IPv4*", Jan. 12, 2000.

Jonathan B. Postel, J., "*Simple Mail Transfer Protocol*", STD 10, RFC 821, Aug. 1982.

Crocker, D. and P. Overrell, "*Augmented BNF For Syntax Specifications: ABNF*", RFC 2234, Nov. 1997.

* cited by examiner

Figure 2

| Access List | |
|---|---|
| Destination Address | VPN Tunnel? |
| 192.1.14.8 | Yes |
| 12.23.144.6 | Yes |
| 112.64.4.7 | No |
| 11.0.0.0 | Yes |
| ... | ... |

Figure 9

| Client Association Table | | |
|---|---|---|
| Machine Name/User Name | Enterprise Address | Timestamp |
| VPNclientname 907 | 192.40.9.31 | 2:31 |
| VPNclientname 915 | 12.5.90.133 | 3:30 |
| ... | ... | ... |
| ... | ... | ... |

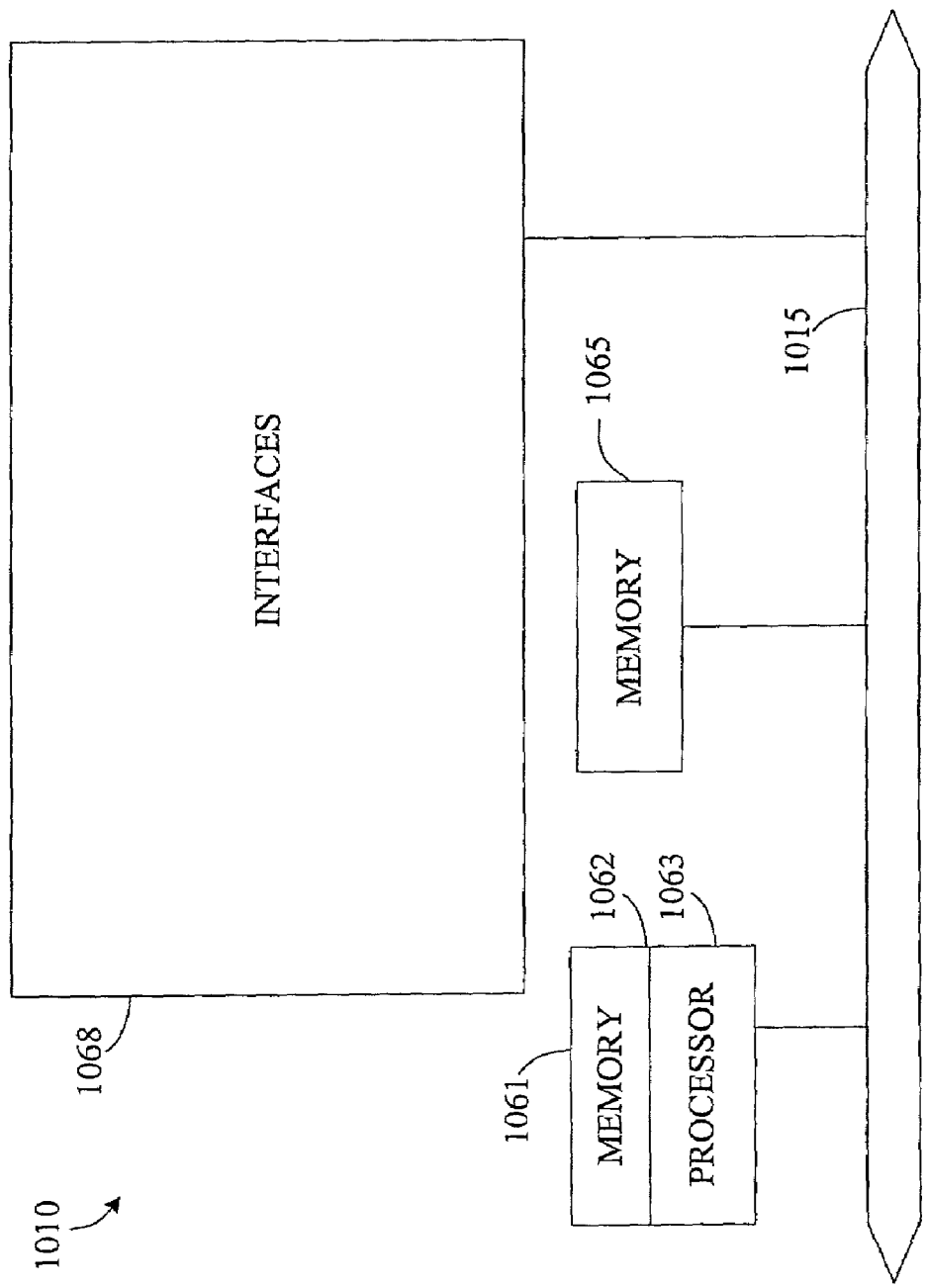

METHODS AND APPARATUS FOR VIRTUAL PRIVATE NETWORK BASED MOBILITY

BACKGROUND OF THE INVENTION

1. Field of the Invention

The present invention relates generally to virtual private networks. More particularly, the present invention relates to methods and apparatus enabling virtual private network based mobile communications.

2. Description of Related Art

Conventional virtual private networks deployed on a public network infrastructure provide clients the same security, management, quality of service policies, and benefits provided to clients in private networks. Typical applications of virtual private networks (VPN) allow remote network nodes such as telecommuters, suppliers, partners, or distant offices access to a private network such as a company network through a VPN server. Many VPN applications use IPsec (Internet Protocol Security) to provide encryption and authentication of messages between a VPN client and a VPN server. The secure connection between a VPN client and a VPN server is often referred to as a VPN tunnel. In most cases, a VPN client accessing a private network through a VPN tunnel can enjoy the same privileges and access capabilities as a client within the private network.

However, conventional virtual private networks have not been designed to allow mobile VPN clients. A VPN client with a particular client IP subnetwork address associated with a particular subnetwork can typically only access the private network through the VPN server as long as the VPN client maintains the same IP subnetwork address. If the IP subnetwork address of the VPN client changes, the sessions the VPN client has with the nodes in the private network are terminated. It should be noted that a client is generally referred to as a VPN client after a VPN tunnel is established. However, a potential VPN client with a VPN tunnel either broken or not established will still be referred to herein as a VPN client for clarity.

More particularly, the IP subnetwork address of the VPN client changes when the VPN client moves from a first subnetwork to a second subnetwork. For example, a laptop user riding on a train may be accessing a private network through a VPN server. The laptop user may be assigned a particular IP subnetwork address associated with a first subnetwork. However, when the vehicle moves into a second subnetwork, a new IP subnetwork address is assigned to the laptop user. The VPN tunnel is not maintained when the IP subnetwork address of the VPN client changes. Thus, after moving to a different subnetwork, the VPN client can only access the private network by establishing a new VPN tunnel to the VPN server. However, establishing a new VPN tunnel disrupts any sessions that the VPN client may have been conducting with network nodes. As a result, this disruption prevents seamless communications between the VPN client and various network nodes when the client moves. Virtual Private Networks are described in more detail in *Implementing Virtual Private Networks* by Steven Brown (ISBN: 007135185X), the entirety of which is incorporated by reference for all purposes.

Other standards such as MobileIP allow users to maintain existing sessions when moving between various subnetworks. However, many conventional MobileIP standards do not provide for secure connections. Furthermore, not all clients wishing to access a home network securely have Mobile IP. Consequently, it is desirable to provide improved mobility solutions for VPN clients using VPN.

SUMMARY OF THE INVENTION

Methods and apparatus for enabling VPN based mobility are provided. A VPN client having a client subnetwork address corresponding to a particular subnetwork can create a VPN tunnel and obtain an enterprise address from a VPN server. Using the VPN tunnel, the VPN client can establish sessions with a variety of destination nodes including destination nodes on a private or enterprise network associated with the VPN server. When the client moves, the VPN client can acquire a new address that may correspond to a new subnetwork, but the VPN server provides the VPN client with the same enterprise address. Accordingly, the VPN client can maintain existing sessions with destination nodes using the same enterprise address.

When a client moves from one subnetwork to a new subnetwork, the client can maintain its enterprise address knowing that the VPN server can assign it the same enterprise address. By reusing the same enterprise address, client sessions are not terminated.

In one embodiment, a method for allowing VPN based mobile communications in a network having a VPN server and a VPN client is provided. A first message is received from the VPN client, the first message having a first address associated with a first subnetwork as a source address and an enterprise address as an encapsulated address. An association between the enterprise address and the VPN client is maintained. A second message from the VPN client is received, the second message having a second address associated with a second subnetwork as the source address and the enterprise address as the encapsulated address, wherein using the same enterprise address allows VPN based mobile communications when a VPN client moves from the first subnetwork to the second subnetwork.

In another embodiment, an apparatus for allowing VPN based mobile communications in a network having a VPN server and a VPN client is provided. The apparatus includes means for receiving a first message from the VPN client, the first message having a first address associated with a first subnetwork as a source address and an enterprise address as an encapsulated address, means for maintaining an association between the enterprise address and the VPN client, and means for receiving a second message from the VPN client, the second message having a second address associated with a second subnetwork as the source address and the enterprise address as the encapsulated address, wherein using the same enterprise address allows VPN based mobile communications when a VPN client moves from the first subnetwork to the second subnetwork.

In yet another embodiment, a method for allowing communication in a network having a VPN server and a VPN client is provided. The method includes transmitting a first message to the VPN server with a first address associated with a first subnetwork as a source address and an enterprise address as an encapsulated address, detecting a change in location of the VPN client from the first subnetwork to a second subnetwork, and transmitting a second message to the VPN server with a second address associated with the second subnetwork as the source address and the enterprise address as the encapsulated address, wherein encapsulating the same enterprise address allows communication when a VPN client moves from a first subnetwork to a second subnetwork.

In another embodiment, an apparatus for allowing communication in a network having a VPN server and a VPN client is provided. The apparatus includes memory and a processor coupled to memory, the processor configured to transmit a first message to the VPN server with a first address associated with a first subnetwork as a source address and an enterprise address as an encapsulated address, detect a change in location of the VPN client from the first subnetwork to a second subnetwork and transmit a second message to the VPN server with a second address associated with the second subnetwork as the source address and the enterprise address as the encapsulated address, wherein encapsulating the same enterprise address allows communication when a VPN client moves from a first subnetwork to a second subnetwork.

Another aspect of the invention pertains to computer program products including a machine readable medium on which is stored program instructions, tables or lists, and/or data structures for implementing a method as described above. Any of the methods, tables, or data structures of this invention may be represented as program instructions that can be provided on such computer readable media.

A further understanding of the nature and advantages of the present invention may be realized by reference to the remaining portions of the specification and the drawings.

BRIEF DESCRIPTION OF THE DRAWINGS

The invention may best be understood by reference to the following description taken in conjunction with the accompanying drawings, which illustrate specific embodiments of the present invention.

FIG. 2 is a diagrammatic representation of an access list that a VPN server may transmit to a VPN client.

FIG. 9 is a diagrammatic representation of a client association table.

FIG. 10 is a diagrammatic representation of a system that can be used to implement a VPN client or VPN server.

DETAILED DESCRIPTION OF SPECIFIC EMBODIMENTS

Figure 1:
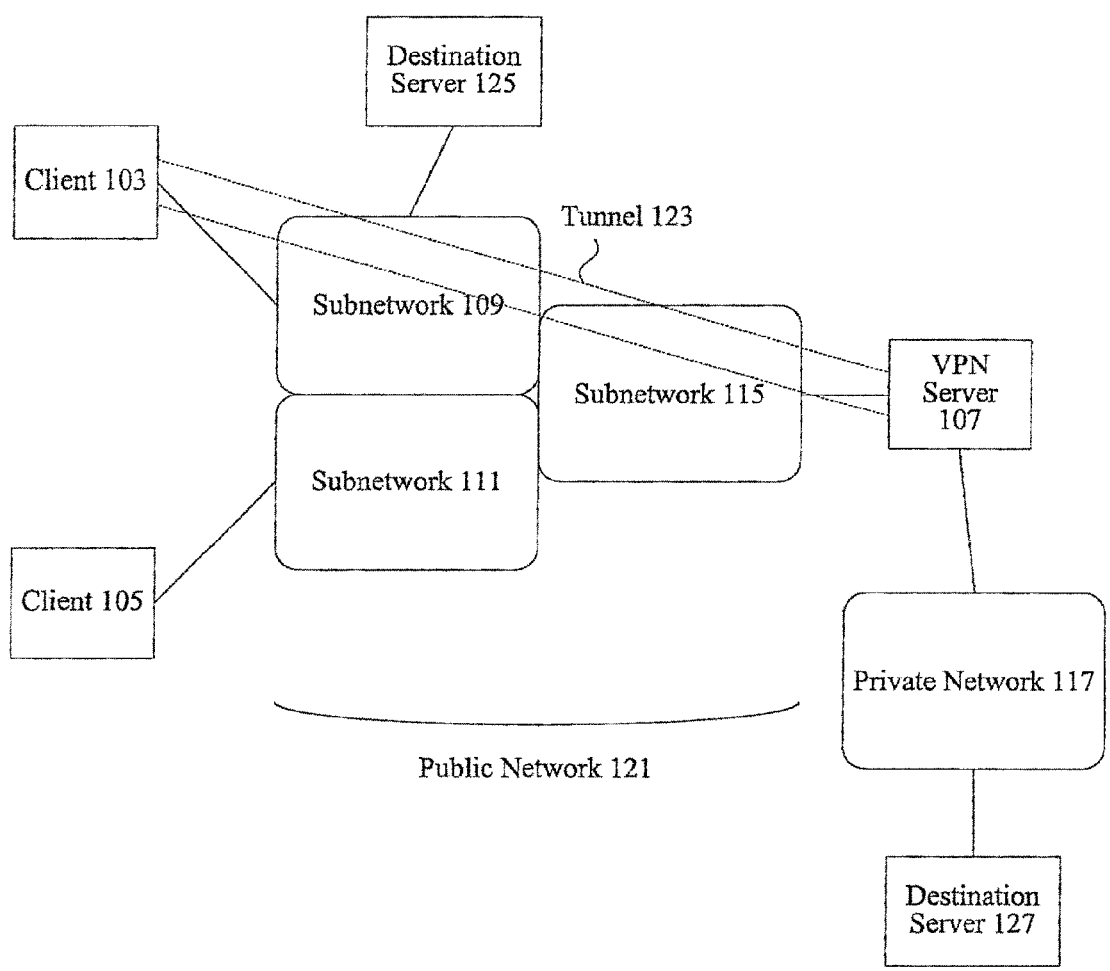
FIG. 1 is a diagrammatic representation of a system that can use the techniques of the present invention.

In the following description, numerous specific details are set forth in order to provide a thorough understanding of the present invention. It will be obvious, however, to one skilled in the art, that the present invention may be practiced without some or all of these specific details. In other instances, well known process steps have not been described in detail in order not to unnecessarily obscure the present invention.

Conventional virtual private networks do not allow VPN clients to move between subnetworks without breaking existing sessions. More particularly, a VPN client in a particular subnetwork can acquire a client subnetwork address from an Internet Service Provider (ISP). The client subnetwork address, however, is typically specific to the particular subnetwork that is servicing the client at that particular time. The client may therefore use the client subnetwork address to contact the VPN server and provide the VPN server with a user name and password to acquire an enterprise address. The enterprise address is the address that the VPN client uses to communicate with other nodes such as nodes in the company private network. A client that at some point sets up a session with a VPN server is referred to herein as a VPN client. For instance, the enterprise address can be a company IP address. Thus, other nodes including nodes in the company private network will see the VPN client as having the enterprise address, and will therefore communicate with the VPN client via the enterprise address. Accordingly, sessions between the VPN client and a node of the private network can be conducted using the enterprise address. It should be noted that a client can have two distinct addresses. An address specific to a particular subnetwork that can be obtained from an ISP is referred to herein as a subnetwork address or a client subnetwork address. The subnetwork address can be an IP address. An address provided by a VPN server and assigned to the client is referred to herein as an enterprise address.

Traditionally, by using the subnetwork address and the enterprise address, the VPN client can maintain a VPN tunnel between itself and the VPN server. However, when the subnetwork address of the VPN client changes, the VPN tunnel is broken. In conventional systems, the VPN client is typically required to contact the VPN server with a new subnetwork address, a user name, and password to acquire a new enterprise address. The new enterprise address allows the creation of a new VPN tunnel, but existing sessions are dropped. Thus, restarting a VPN tunnel can be disruptive.

The present invention provides methods and apparatus for improving client mobility. In one embodiment, the VPN client is modified to use the same enterprise address whether it is accessing the VPN server from a first subnetwork or from a second subnetwork. The VPN server can be modified to maintain an association between the VPN client and the enterprise address. By using the same enterprise address, existing sessions between the VPN client and various nodes such as nodes in a private network can be maintained. Even when a VPN client moves from a first subnetwork to a second subnetwork, other nodes see the VPN client as maintaining a single enterprise address. Thus, other nodes, including nodes in the company private network, will see that the VPN client still has the same enterprise address and will be able to maintain existing sessions.

It should be noted that although the techniques of the present invention will be described in the context of IPsec based VPN, variations to VPN are contemplated. For example, encryption protocols such as DES and Triple DES can be used in IPsec. VPN as well as VPN variants are referred to herein as VPN.

FIG. 1 is a diagrammatic representation of a system in which embodiments of the present invention may be implemented. The subnetworks 109, 111, and 115 are part of a public network 121. The public network 121 can be connected with a variety of private networks as well as other public networks through different network nodes. For example, the public network 121 is connected to private network 117 through a VPN server 107. As shown, a destination server 127 may be part of the private network 117. The public network 121 is also connected to a destination server 125 as well as clients 103 and 105. In one example, a client 103 may be a laptop attempting to access a company private network 117 through public network 121 and VPN server 107. For instance, client 103 may be connected to public network 121 through an Internet service provider. In this example, client 103 may acquire a subnetwork address from the Internet service provider associated with subnetwork 109.

When the subnetwork address is obtained, the subnetwork address may be specifically associated with subnetwork 109. Using the subnetwork address, client 103 can access a destination server 125 in a public network 121. However, client 103 can not access a private network destination server 127 until it is granted access by VPN server 107. To acquire access to destination server 127 in a private network 117, a client typically sends a request to set up a VPN tunnel or an access request to the VPN server 107. In the access request, the client 103 provides information such as its subnetwork address, its user name, and its password. The VPN server 107 verifies the user name and password information from client 103 and provides the client 103 with an enterprise address. The enterprise address can be any address that allows a VPN server to identify a client 103. According to various embodiments, the enterprise address is a subnetwork address associated with the private network 117. For instance, the enterprise address may be a company IP address. VPN server 107 and client 103 also exchange messages to allow encryption and authentication of messages transmitted between the two network nodes. As will be appreciated by one of skill in the art, encryption and authentication can be accomplished using IPsec.

The use of encryption, authentication, and the enterprise address allow a VPN tunnel 123 to be established between client 103 and VPN server 107. It should be noted that VPN tunnel 123 is an abstraction depicting the secure traffic flow between client 103 and VPN server 107. VPN tunnels will be described in further detail below. Even though the abstraction provides for a VPN tunnel between client 103 and VPN server 107, messages flowing between client 103 and VPN server 107 may actually flow through a variety of additional network nodes in a public network 121. A VPN server 107 not only provides client 103 with information to create a VPN tunnel 123, the VPN server 107 also provides client 103 with an access list. In typical implementations, the access list provides information to a client 103 regarding which messages should be sent through a particular VPN tunnel, as will be described in further detail below.

As will be appreciated by one of skill in the art, an access list can be used to allow split tunneling. Split tunneling provides that messages associated with particular destinations are sent directly to the destination while other messages are sent to various destinations through a VPN tunnel 123 and VPN server 107. According to various embodiments, nodes on a private network 117 are accessed through VPN tunnel 123 while nodes on public network 121 are accessed directly. According to other embodiments, both nodes on a private network 117 and nodes on a public network 121 are accessed through VPN tunnel 123.

FIG. 2 is a diagrammatic representation of an access list that a VPN server 107 may send to client 103 to provide information for split tunneling. Access list 201 contains a column 219 of destination addresses and a column 205 indicating whether or not to use a VPN tunnel. Each destination address 203, 207, and 209 may be a subnetwork address. A flag 213, 215, or 217 is used to indicate whether messages destined for a corresponding address 203, 207, or 209 should be sent via a VPN tunnel, and therefore should be encrypted. In one example, a client 103 may wish to transmit a message to destination address 203 corresponding to 192.1.14.8. A client 103 can perform a lookup to see whether messages sent to destination address 203 should be sent through a VPN tunnel. Upon determining that the message should be encrypted, the client can send any message to destination address 203 through VPN tunnel 213. As will be appreciated by one of skill in the art, an access list may not always be used in various implementations of VPN.

The access lists may also be represented in a variety of manners. In one embodiment, only destination addresses that should be accessed through a VPN tunnel are listed in the access list. In another embodiment, only destination addresses that should be accessed directly are listed. Any access list indicator including flags can be used to indicate that a particular message should be sent through a VPN tunnel to a VPN server. The VPN server can then direct messages out to the appropriate destination.

According to various embodiments, split tunneling is not used. When split tunneling is not used, all messages sent from a client are sent to the VPN server through a VPN tunnel without regard to an access list.

Figure 3:
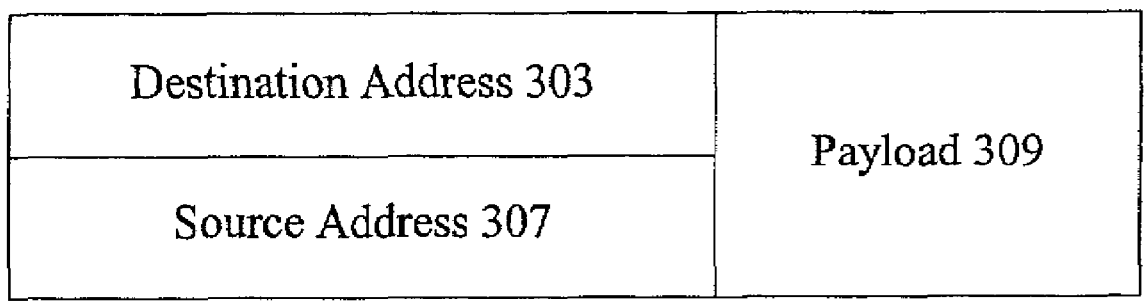
FIG. 3 is a diagrammatic representation of a message a VPN client can transmit using split tunneling.

FIG. 3 is a diagrammatic representation of a message that can be sent out directly out to the network without the use of a VPN tunnel. The source address 307 can be the subnetwork address of the client transmitting the message. The destination address 303 can be the subnetwork address of the content server or destination server that the client is attempting to access. The payload 309 may contain information or a request for information. As will be appreciated by one of skill in the art, messages may contain other information such as the length of a packet, number of hops, quality of service information, etc. The source address 307 and the destination address 303 can be used for communications between the client node and the destination node without the use of a VPN tunnel.

Figure 4A:
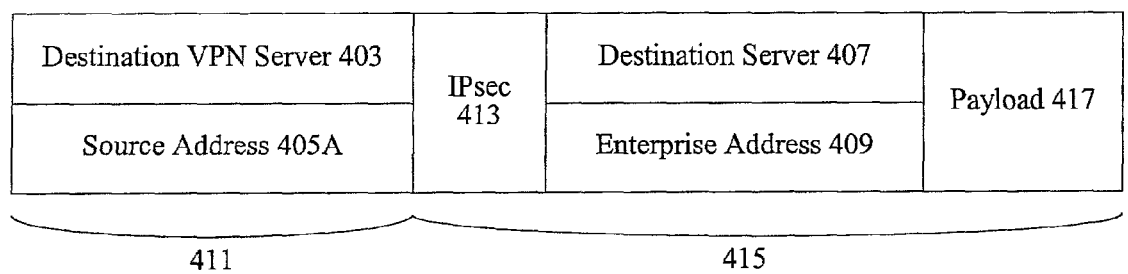
FIG. 4A is a diagrammatic representation of a message a VPN client can transmit using a VPN tunnel.

In accordance with various embodiments, a VPN tunnel should be established to send a message from a client outside the private network to a node within the private network, or from a node within the private network to a client outside the private network. FIG. 4A is a diagrammatic representation of a message that can be sent from a client to a destination when a VPN tunnel is used. For example, the source address 405A can be the subnetwork address of the client. Moreover, in this example, the destination address is the subnetwork address of the VPN server 403. In one embodiment, in order for a VPN client to send a message to a VPN server, the VPN server address 403 and the subnetwork address 405 are contained in the outer portion 411 of the message. The outer portion of 411 is typically not encrypted to allow the message 401 to be routed using conventional routing mechanisms to a VPN server.

In this example, the encapsulated portion 415, however, is typically encrypted using IPsec 413. Encapsulated portion 415 provides the VPN tunnel with security. More particularly, security is provided through enabling authentication of the sender (e.g., via information in the encapsulated portion 415) and encryption of data as well. For instance, the encapsulated portion 415 preferably contains the enterprise address 409 allocated by the VPN server to the VPN client during the creation of the VPN tunnel, which may be used to authenticate the sender. The encapsulated portion 415 also contains the destination address of the server 407 that the client wishes to access. In one example, the destination server 407 may be a Web server containing a page that the client wishes to view. The encapsulated portion 415 may also contain a payload 417.

In one implementation, a client wishes to access a Web server. A client examines the access list to determine if the Web server address is on the access list. If the Web server address is not on the access list, the client can send a packet directly to the Web server using its subnetwork address as the source address and the address of the Web server as the destination address, as shown above. If the Web server is on the access list, the client is directed to send a packet to the Web server through a VPN tunnel and a VPN server. The client uses its own address as the source address and the address of the VPN server as the destination address of a message. The message contains an encapsulated portion 415 with a destination address 407 set as the address of the Web server and the source address 409 set as the enterprise address allocated by the VPN server. When the VPN server receives the message, the VPN server can decrypt the message, authenticate the sender via the enterprise address (source address 409) and forward the encapsulated portion 415 of the message to the Web server.

The Web server receives the encapsulated portion of the message and sees that the source of the message is the enterprise address. The Web server can send content to the enterprise address represented by the VPN server. The VPN server can then encapsulate the content and forward the content to the client. As noted above, the Web server does not know the actual subnetwork address of the client. The Web server may only know the enterprise address. In other words, the VPN server performs a mapping of the enterprise address to the client address.

When a client moves from one subnetwork to another subnetwork, the client typically acquires a new subnetwork address associated with the new subnetwork. In one example, a client can be a personal digital assistant user accessing a corporate network. More particularly, the client may be riding in a vehicle moving from one subnetwork to another subnetwork. When a client moves from a first subnetwork to a second subnetwork, the client typically acquires a new subnetwork address associated with the second subnetwork. When the client acquires the new subnetwork address associated with the second subnetwork, the VPN tunnel is broken. Conventional VPN servers do not accept packets from the same client having different (e.g., unrecognizable) source addresses.

Figure 4B:
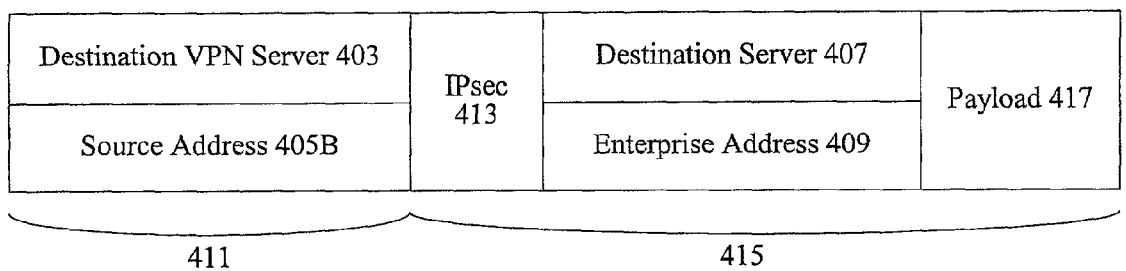
FIG. 4B is a diagrammatic representation of a message a VPN client can transmit using a VPN tunnel when the VPN client moves to a different subnetwork.

When the VPN tunnel is broken, the client typically tries to reinitiate the VPN tunnel. The client sends the VPN server its new subnetwork address, a user name, and a password, and the VPN server provides the client with a new enterprise address. FIG. 4B is a diagrammatic representation of a message that a client in a new subnetwork can transmit to a VPN server. The source address 405B is the new subnetwork address associated with the new subnetwork. The destination address is the VPN server address 403. It should be noted that the destination address is still the same VPN server address as it was when the client was still in the first subnetwork. The encapsulated portion of the message contains the address of a destination server 407 such as a Web server and the new enterprise address 409 allocated during creation of the VPN tunnel when the client moved to the new subnetwork. Sessions that the client may have had when a client was in a first subnetwork are not maintained when the client moves into the second subnetwork. One reason is that the enterprise address is no longer the same. In other words, the enterprise address previously assigned to the client no longer exists. Thus, the movement of a client from a first subnetwork to a second subnetwork causes the disruptive dropping of sessions.

The present invention allows the maintenance of existing sessions between a client and a destination node when the client moves from a first subnetwork to a second subnetwork. According to various embodiments, existing sessions can be maintained by modifying the VPN client and the VPN server. More particularly, the VPN client and the VPN server can be modified to allow the VPN client to use the same enterprise address whether the VPN client is in a first subnetwork or a second subnetwork. By using the same enterprise address, a client's existing sessions with a Web server, for example, can be maintained because the Web server can continue to send messages to the client using the same address.

Figure 5:
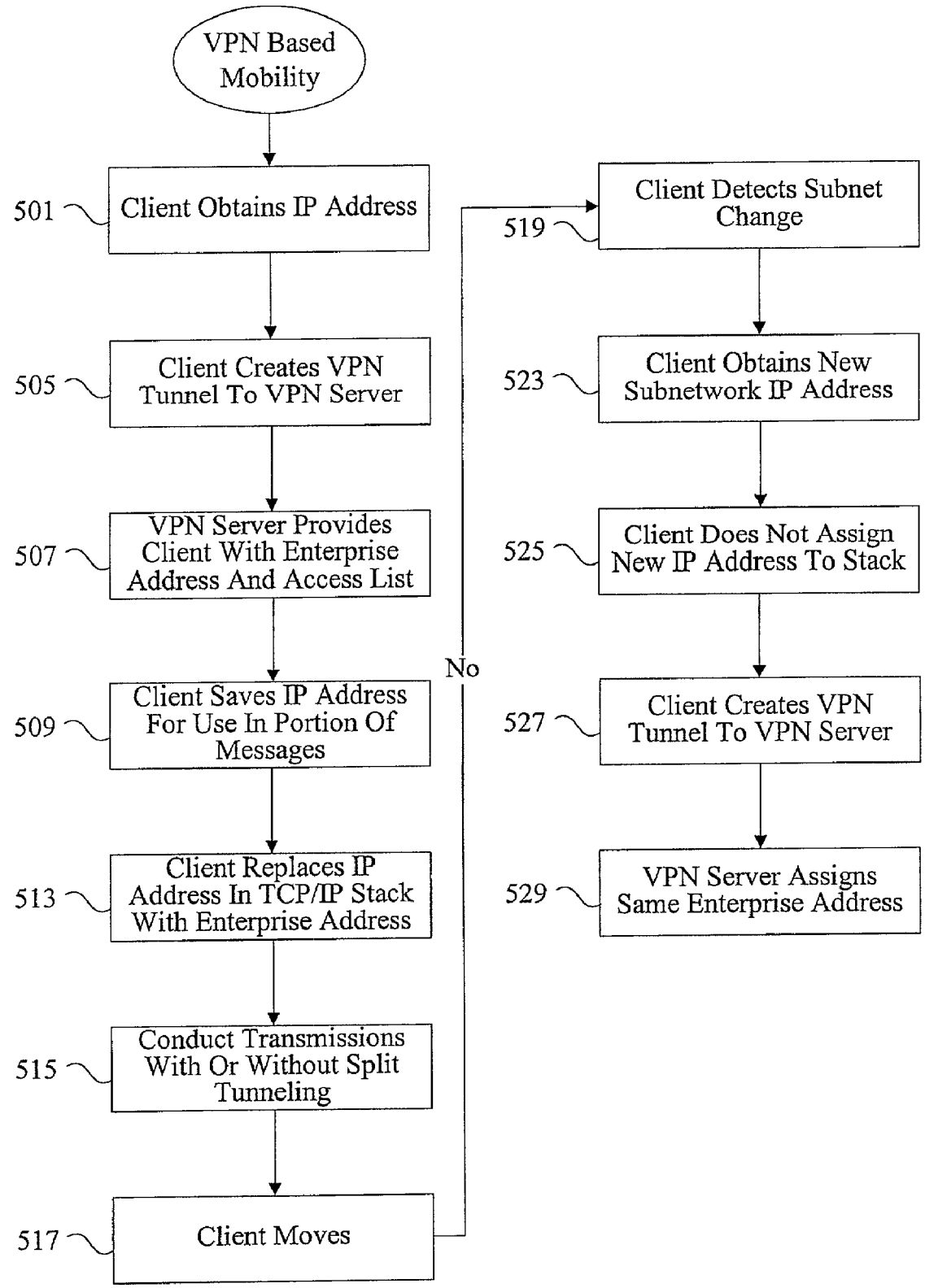
FIG. 5 is a process flow diagram showing VPN client processes that can allow mobility.

FIG. 5 is a process flow diagram depicting some of the changes that can be made to the VPN client to allow the VPN client to seamlessly roam from a first subnetwork to a second subnetwork. At 501, a client is in a first subnetwork and obtains a first subnetwork address from an Internet service provider. The first subnetwork address is inserted into the TCP/IP stack to allow communication with other nodes in the network. At 505, the client attempts to set up a VPN tunnel with the VPN server by transmitting the first subnetwork address, a username, and a password to the VPN server. The VPN server verifies the information and provides the client with an enterprise address as well as an access list at 507. At 509, the client saves the first subnetwork address to use as an outer portion source address for outgoing packets. For instance, the first subnetwork address can be saved in the device driver or in the operating system. At 513, the VPN client replaces the first subnetwork address in the TCP/IP stack with the enterprise address acquired from the VPN server. By replacing the first subnetwork address with the enterprise address, the enterprise address can be used for all communications whether the client is in a first subnetwork or a second subnetwork. At 515, the client can send messages with or without the VPN tunnel. If messages are sent without the VPN tunnel, the source address is the first subnetwork address and the destination address can be the destination node of interest. If messages are sent through the VPN tunnel, the source address is the first subnetwork address and the destination address is the address of the VPN server. The encapsulated destination address is the destination node of interest and the encapsulated source address is the enterprise address. Such a message resembles the message shown in FIG. 4A.

At 517, the client moves from a first subnetwork to a second subnetwork. At 519, the client detects the change in subnetworks without user intervention. One of the benefits of the techniques of the present invention is that VPN based mobility can be accomplished in a manner transparent to the user. In many conventional applications, the client moving from a first subnetwork to a second subnetwork had to acquire a new subnetwork address and manually start the creation of a new VPN tunnel. Existing sessions would be dropped. However, the techniques of the present invention allow a VPN tunnel and existing sessions to be maintained without user interaction. The seamless mobility can be accomplished by automatically detecting a change in subnetwork using lower layer protocols. A variety of conventional mechanisms for detecting subnet changes are available. Some techniques include using the lifetime field from a router advertisement using IRDP as described in RFC 1256 or using network prefixes as described in RFC 2002, the entirety of which is incorporated by references for all purposes.

The VPN client can then automatically obtain a second subnetwork address associated with the second subnetwork at 523. In one embodiment, the second subnetwork address can be obtained using DHCP. In other embodiments, a second subnetwork address can be automatically entered by a VPN client. At 525, the VPN client recognizes the change in subnetworks and does not replace the enterprise address in the TCP/IP stack with the second subnetwork address. The second subnetwork address instead can be saved in the device driver. The enterprise address remains the same in the TCP/IP stack. Without user intervention, the VPN client automatically attempts to re-establish the VPN tunnel by sending the second subnetwork address, a username, and a password to the VPN server. The tunnel to the VPN server is created at 527. Because of modifications to the VPN server which will be discussed below, the VPN server assigns the same enterprise address to the VPN client at 529. By providing the same enterprise address to the VPN client, existing sessions are maintained. As will be appreciated by one of skill in the art, although the techniques of the present invention can be accomplished without user intervention, it will be appreciated that certain circumstances may benefit from user input. Various techniques for acquiring a new subnetwork address and establishing a VPN tunnel can also be accomplished manually.

Figure 6:
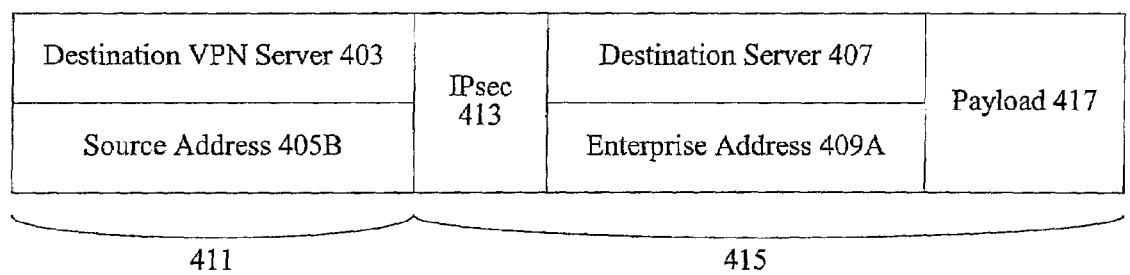
FIG. 6 is a diagrammatic representation of a message a VPN client in a second subnetwork can transmit.

FIG. 6 is a diagrammatic representation of a packet that the VPN client may send to the VPN server after the VPN server has assigned the same enterprise address to a VPN client that has moved to the second subnetwork. Outer portion 411 contains a destination address set as the address of the destination VPN server 403. The source address is set as the second subnetwork address 405B associated with a second subnetwork. The encapsulated portion 415 contains the destination address 407 of a server such as a Web server. The encapsulated portion 415 also contains the same enterprise address 409 that was used when a VPN client was in a first subnetwork. As noted above, using the same enterprise address 409 allows existing sessions to be maintained.

Figure 7:
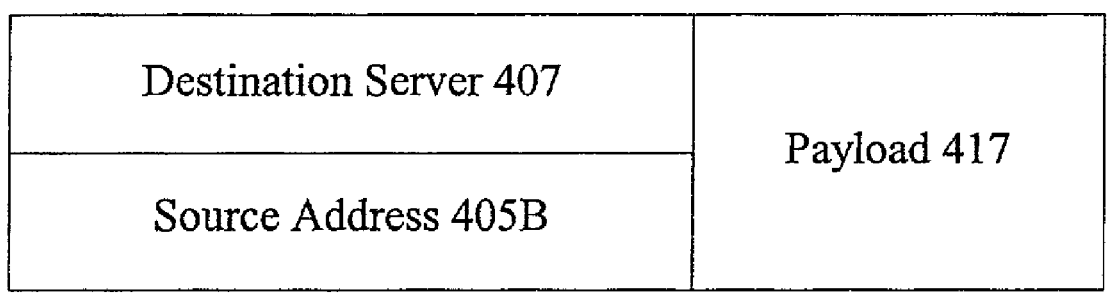
FIG. 7 is a diagrammatic representation of a message a VPN client in a second subnetwork can transmit using split tunneling.

The VPN client can also send messages out directly onto a network without the use of a VPN tunnel. The VPN client may send a message directly out onto the network when the access list indicates that the destination may be reached without using a VPN tunnel. The techniques of the present invention allow for split tunneling. FIG. 7 is a diagrammatic representation of a packet that the VPN client may send directly to a destination without the use of a VPN tunnel. As shown, the destination address 407 can be the address of the content server of interest, while the source address 405B can be the second subnetwork address associated with the second subnetwork.

Figure 8:
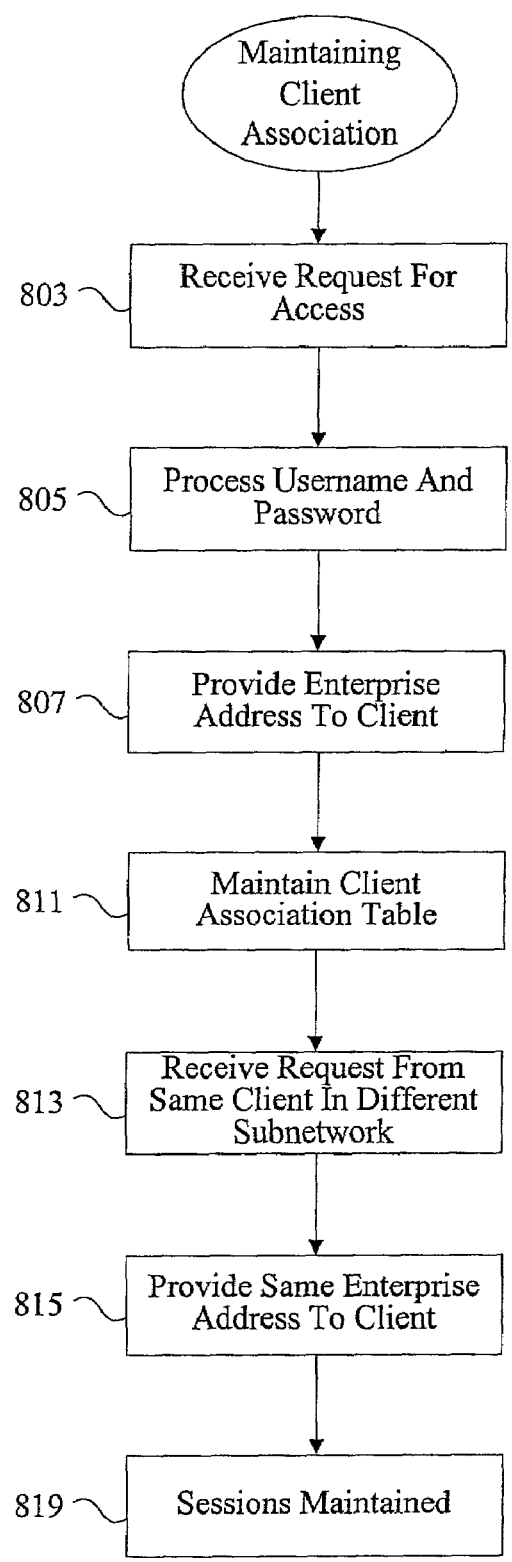
FIG. 8 is a process flow diagram showing VPN server processes that can allow mobility.

As noted above, modifications to a VPN server are made to allow the allocation of the same enterprise address to a mobile VPN client regardless of whether the client is in a first subnetwork or a second subnetwork. FIG. 8 is a process flow diagram showing modifications to the server that can be used to provide a VPN client with the same enterprise address. At 803, the VPN server receives a request for access. The request for access may include the subnetwork address, a username, and a password of a VPN client. At 805, the VPN server verifies the username and password. At 807, the VPN server provides an enterprise address to the VPN client to allow the VPN client to establish a VPN tunnel.

The VPN server maintains a client association table at 811. Any mechanism providing an association between the client and the enterprise address is referred to herein as a client association table. For instance, the client association table can be maintained in a table listing usernames and their associated enterprise addresses. The client association table can also be maintained using various databases and log files providing information on client identifiers, usernames, and enterprise addresses. By maintaining an association between the client and the enterprise address, the VPN server can provide the same enterprise address to a client even if the client is registering from a different subnetwork address associated with a different subnetwork. If a client moves from a first subnetwork to a second subnetwork and registers with a second subnetwork address, the VPN server can recognize the client with the username. At 813, the VPN server receives an access request having a second subnetwork address, a username, and a password of the same VPN client. The VPN server can access the client association table to determine whether the VPN client has been provided an enterprise address in the past. The VPN server can then provide the VPN client the same enterprise address.

By maintaining the association between the client and the enterprise address, the enterprise address can be provided to the same client at 815 even though the client is registering with a different subnetwork address. By maintaining the enterprise address, sessions are maintained at 819.

FIG. 9 is a diagrammatic representation of an exemplary client association table that can be used in accordance with various embodiments of the invention. As shown, column 903 is a list of machine names/usernames that are stored in the client association table 901. Column 905 is a list of enterprise addresses associated with the usernames. In one example, VPNclientname 907 may include information on both a machine name and a user name to conduct video and audio sessions with nodes in a private network. In this manner, the client association table allows an association of usernames with enterprise addresses.

Column 909 can contain timestamps providing information on how long the entry should be maintained. According to various embodiments, entries in the client association table can be maintained for any period of time. The length of time the entry is maintained can be determined by considering the number of enterprise addresses available to the VPN server and the typical amount of time the VPN client takes to reinitiate a VPN tunnel upon moving to a second subnetwork. In one example, if the VPN server has abundant enterprise addresses, each VPN client can be permanently associated with an enterprise address. Of course, if the VPN server has few enterprise addresses, the association between the VPN client and the enterprise address may be brief to allow other VPN clients access to a private network. Similarly, if the time it takes for a VPN client to register in any new subnetwork is brief, the entry in the client association table can be maintained for a brief period of time. If, however, a VPN client takes a substantial amount of time to register in a new subnetwork, the entry in a client association table can be maintained for a longer period of time. According to various embodiments, the entry in the client association table is maintained for 15 minutes, although the range can vary from seconds to days.

Although the techniques of the present invention have been discussed with reference to VPN, one of skill in the art will appreciate that the techniques can be used with a variety of different architectures including variants to VPN. Moreover, different encryption algorithms can also be used to provide security for the VPN tunnel.

Generally, the VPN mobility techniques may be implemented on software and/or hardware. For example, each of the described techniques can be implemented in an operating system kernel, in a separate user process, in a library package bound into network applications, in a device driver on a specially constructed machine, or on a network interface card. According to specific embodiments, the techniques of the present invention are implemented in software such as an operating system or in an application running on an operating system.

Software or software/hardware hybrid implementations of the invention may be implemented on general-purpose programmable machines selectively activated or reconfigured by a computer program(s) stored in memory. Such programmable machines may be a network device designed to handle network traffic. Such network devices typically have multiple network interfaces including frame relay and ISDN interfaces, for example. The present invention may be implemented on a general-purpose network host machine such as a personal computer or workstation. Further, the invention may be at least partially implemented on a card (e.g., an interface card) for a network device or a general-purpose computing device.

A VPN client or a VPN server can be implemented on a general purpose computing device. FIG. 10 is a diagrammatic representation of a general purpose computing device that can be used. The computing system 1010 suitable for implementing the present invention includes a master central processing unit (CPU) 1062, interfaces 1068, and a bus 1015 (e.g., a PCI bus). When acting under the control of appropriate software or firmware, the CPU 1062 is responsible for tasks such as acquiring a subnetwork address or assigning an address to a TCP/IP stack. On the VPN server side, the CPU 1062 may be responsible for maintaining associations between clients and enterprises. The CPU 1062 may be a general purpose processor or it may be specially designed hardware for implementing a VPN client or a VPN server. In a specific embodiment, a memory 1061 (such as non-volatile RAM and/or ROM) also forms part of CPU 1062. However, there are many different ways in which memory could be coupled to the system. Memory block 1061 may be used for a variety of purposes such as, for example, caching and/or storing data, programming instructions, etc.

The interfaces 1068 are typically provided as interface cards (sometimes referred to as "line cards"). Generally, they control the sending and receiving of data packets over the network and sometimes support other peripherals used with the router 1010. Among the interfaces that may be provided are Ethernet interfaces, frame relay interfaces, cable interfaces, DSL interfaces, token ring interfaces, and the like. In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow the master microprocessor 1062 to efficiently perform routing computations, network diagnostics, security functions, etc.

Although the system shown in FIG. 10 is one specific network node of the present invention, it is by no means the only VPN client or VPN server on which the present invention can be implemented. For example, an architecture having a single processor that handles communications as well as routing computations, etc. is often used. Further, other types of interfaces and media could also be used with the router.

Regardless of network device's configuration, it may employ one or more memories or memory modules (such as, for example, memory block 1065) configured to store data, program instructions for the general-purpose network operations and/or the packet redirection and replication functions described herein. The program instructions may control the operation of an operating system and/or one or more applications, for example. The memory or memories may also be configured to store the client association table or the access lists noted above.

Because such information and program instructions may be employed to implement the systems/methods described herein, the present invention relates to machine readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media such as optical disks; and hardware devices that are specially configured to store and perform program instructions, such as read-only memory devices (ROM) and random access memory (RAM). The invention may also be embodied in a carrier wave travelling over an appropriate medium such as airwaves, optical lines, electric lines, etc. Examples of program instructions include both machine code, such as produced by a compiler, and files containing higher level code that may be executed by the computer using an interpreter.

While the invention has been particularly shown and described with reference to specific embodiments thereof, it will be understood by those skilled in the art that changes in the form and details of the disclosed embodiments may be made without departing from the spirit or scope of the invention. For example, the embodiments described above may be implemented using firmware, software, or hardware. Moreover, embodiments of the present invention may be employed with a variety of communication protocols and should not be restricted to the ones mentioned above. For example, the VPN server may be connected to multiple private networks only one of which the VPN client has access to. The public network may also include a variety of disparate networks such as LANs, WANs, wireless networks, etc. Therefore, the scope of the invention should be determined with reference to the appended claims.

The invention claimed is:

1. A method for allowing VPN based mobile communications in a network having a VPN server and a VPN client, the method comprising:
   receiving a first message from the VPN client, the first message having a first address associated with a first subnetwork as a source address and an enterprise address as an encapsulated address;
   maintain an association between the enterprise address and the VPN client;
   receiving a second message from the VPN client, the second message having a second address associated with a second subnetwork as the source address and the enterprise address as the encapsulated address, wherein using the some enterprise address allows VPN based mobile communications when a VPN client moves from the first subnetwork to the second subnetwork.

2. The method of claim 1, further comprising providing the VPN client with an access list identifying one or more destinations that can be accessed through the VPN server.

3. The method of claim 1, wherein the first and second messages are associated with an established VPN tunnel.

4. The method of claim 1, wherein the encapsulated address but not the source address is encrypted.

5. The method of claim 1, wherein the enterprise address is a private network IP address.

6. The method of claim 1, wherein using the same enterprise address allows VPN based mobile communications to continue seamlessly.

7. The method of claim 1, wherein maintaining an association between the enterprise address and the VPN client comprises associating the enterprise address with a username.

8. The method of claim 7, wherein the enterprise address is further associated with a password.

9. The method of claim 1, further comprising:
providing the enterprise address associated with the user to the VPN client.

10. The method of claim 9, further comprising:
authenticating the VPN client prior to providing the enterprise address associated with the VPN client to the VPN client.

11. The method of claim 9, wherein the enterprise address is provided by accessing the client association table.

12. An apparatus for allowing VPN based mobile communications in a network having a VPN server and a VPN client, the apparatus comprising:
means for receiving a first message from the VPN client, the first message having a first address associated with a first subnetwork as a source address and an enterprise address as an encapsulated address;
means for maintaining an association between the enterprise address and the VPN client;
means for receiving a second message from the VPN client, the second message having a second address associated with a second subnetwork as the source address and the enterprise address as the encapsulated address, wherein using the same enterprise address allows VPN based mobile communications when a VPN client moves from the first subnetwork to the second subnetwork.

13. The apparatus of claim 12, further comprising providing the VPN client with an access list identifying one or more destinations that can be accessed through the VPN serer.

14. The apparatus of claim 12, wherein the first and second messages are associated with an established VPN tunnel.

15. The apparatus of claim 12, wherein the encapsulated address but not the source address is encrypted.

16. The apparatus of claim 12, wherein the enterprise address is a private network IP address.

17. The apparatus of claim 12, wherein using the same enterprise address allows VPN based mobile communications to continue seamlessly.

18. The apparatus of claim 12, wherein main an association between the enterprise address and the VPN client comprises associating the enterprise address with a username.

19. The apparatus of claim 18, wherein the enterprise address is further associated with a password.

20. The apparatus of claim 12, further comprising:
providing the enterprise address associated with the user to the VPN client.

21. The apparatus of claim 20, further comprising:
authenticating the VPN client prior to providing the enterprise address associated with the VPN client to the VPN client.

22. A computer readable medium comprising computer code for allowing VPN based mobile communications in a network having a VPN server and a VPN client, the computer readable medium comprising:
computer code for receiving a first message from the VPN client, the first message having a first address associated with a first subnetwork as a source address and an enterprise address as an encapsulated address;
computer code for maintaining an association between the enterprise address and the VPN client,
computer code for receiving a second message from the VPN client, the second message having a second address associated with a second subnetwork as the source address and the enterprise address as the encapsulated address, wherein using the same enterprise address allows VPN based mobile communications when a VPN client moves from the first subnetwork to the second subnetwork.

23. The computer readable medium of claim 22, further comprising:
computer code for providing the VPN client with an access list identifying one or more destinations that can be accessed through the VPN server.

24. The computer readable medium of claim 22, wherein the first and second messages are associated with an established VPN tunnel.

25. The computer readable medium of claim 22, wherein the encapsulated address but not the source address is encrypted.

26. The computer readable medium of claim 22, wherein the enterprise address is a private network IP address.

27. The computer readable medium of claim 22, wherein using the same enterprise address allows VPN based mobile communications to continue seamlessly.

28. The computer readable medium of claim 22, wherein maintaining an association between the enterprise address and the VPN client comprises associating the enterprise address with a username.

29. The computer readable medium of claim 28, wherein the enterprise address is further associated with a password.

30. The computer readable medium of claim 22, further comprising:
computer code for providing the enterprise address associated with the user to the VPN client.

31. The computer readable medium of claim 30, further comprising:
computer code for authenticating the VPN client prior to providing the enterprise address associated with the VPN client to the VPN client.

32. A method for allowing communication in a network having a VPN server and a VPN client, the method comprising:
transmitting a first message to the VPN server with a first address associated with a first subnetwork as a source address and an enterprise address as an encapsulated address;
detecting a change in location of the VPN client from the first subnetwork to a second subnetwork;
transmitting a second message to the VPN server with a second address associated with the second subnetwork as the source address and the enterprise address as the encapsulated address, wherein encapsulating the same enterprise address allows communication when a VPN client moves from a first subnetwork to a second subnetwork.

33. The method of claim 32, further comprising:
sending authentication information to the VPN server; and
obtaining the enterprise address from the VPN server.

34. The method of claim 32, further comprising:
receiving an access list from the VPN server identifying one or more destinations that can be accessed through the VPN server.

35. The method of claim 34, wherein the second message is transmitted after determining that a first destination is on the access list.

36. The method of claim 35, wherein a third message is transmitted to a second destination not on the access list without encapsulating the enterprise address.

37. The method of claim 33, wherein obtaining the enterprise address is associated with an established VPN tunnel.

38. The method of claim 32, wherein the encapsulated address is encrypted.

39. The method of claim 32, wherein the enterprise address is a company network IP address.

40. The method of claim 32, wherein using the same enterprise address allows VPN based mobile communications to continue seamlessly.

41. The method of claim 32, wherein the enterprise address is associated with a username.

42. The method of claim 32, wherein the first and second addresses are IP addresses.

43. The method of claim 32, further comprising:
replacing the first address in a TCP/IP stack with the enterprise address.

44. The method of claim 43, further comprising:
after the change in location is detected, obtaining the second address;
wherein the enterprise address in the TCP/IP stack is not replaced with the second address.

45. The method of claim 43, further comprising:
storing the first address and the second address in an operating system.

46. The method of claim 43, further comprising:
storing the first address and the second address in a device driver.

47. The method of claim 43, wherein the change in location of the VPN client from a first subnetwork to a second subnetwork is detected without user intervention.

48. The method of claim 47, wherein the VPN client does not replace the enterprise address in the TCP/IP stack with the second subnetwork address upon detecting the change in location.

49. An apparatus for allowing communication in a network having a VPN server and a VPN client, the apparatus comprising:
memory,
a processor coupled to memory, the processor configured to transmit a first message to the VPN server with a first address associated with a first subnetwork as a source address and an enterprise address as an encapsulated address, detect a change in location of the VPN client from the first subnetwork to a second subnetwork and transmit a second message to the VPN server with a second address associated with the second subnetwork as the source address and the enterprise address as the encapsulated address, wherein encapsulating the same enterprise address allows communication when a VPN client moves from a first subnetwork to a second subnetwork.

50. The apparatus of claim 49, wherein the processor is further configured to send authentication information to the VPN server and obtain the enterprise address from the VPN server.

51. The apparatus of claim 49, wherein the processor is further configured to receive an access list from the VPN server identifying one or more destinations that can be accessed through the VPN server.

52. The apparatus of claim 51, wherein the second message is transmitted after determining that a first destination is on the access list.

53. The apparatus of claim 52, wherein a third message is transmitted to a second destination not on the access list without encapsulating the enterprise address.

54. The apparatus of claim 50, wherein obtaining the enterprise address is associated with an established VPN tunnel.

55. The apparatus of claim 49, wherein the encapsulated address is encrypted.

56. The apparatus of claim 49, wherein the enterprise address is a company network IP address.

57. The apparatus of claim 49, wherein using the same enterprise address allows VPN based mobile communications to continue seamlessly.

58. The apparatus of claim 49, wherein the enterprise address is associated with a username.

59. The apparatus of claim 49, wherein the first and second addresses are IP addresses.

60. The apparatus of claim 49, wherein the processor is further configured to replace the first address in a TCP/IP stack with the enterprise address.

61. The apparatus of claim 60, wherein the processor is further configured to obtaining the second address after the change in location is detected, wherein the enterprise address in the TCP/IP stack is not replaced with the second address.

62. The apparatus of claim 60, wherein the processor is further configured to store the first address and the second address in an operating system.

63. The apparatus of claim 60, wherein the processor is further configured to store the first address and the second address in a device driver.

* * * * *